United States Patent [19]

Guilloux

[11] Patent Number: 4,543,518
[45] Date of Patent: Sep. 24, 1985

[54] STATIC TRACTION/BRAKING SWITCH-OVER CIRCUIT FOR A VARIABLE SPEED SYSTEM INCLUDING AN ASYNCHRONOUS MOTOR POWERED BY CURRENT SWITCHING

[75] Inventor: Bernard Guilloux, Meyzieu, France

[73] Assignee: CEM-Compagnie Electro-Mecanique et Compagnie, Paris, France

[21] Appl. No.: 595,151

[22] Filed: Mar. 30, 1984

[30] Foreign Application Priority Data

Mar. 30, 1983 [FR] France .................... 83 05228

[51] Int. Cl.⁴ .................. H02P 3/18; H02M 7/515
[52] U.S. Cl. .................. 318/757; 307/252 M; 363/138
[58] Field of Search .......... 318/757, 759, 803, 375; 307/252 M; 363/37, 138

[56] References Cited

U.S. PATENT DOCUMENTS

| | | |
|---|---|---|
| 3,365,640 | 1/1968 | Gurwicz .................. 318/252 M |
| 3,887,862 | 6/1975 | Hubner .................... 318/803 |
| 4,019,116 | 4/1977 | Klautchek ................ 363/37 |
| 4,039,914 | 8/1977 | Steigerwald et al. ...... 318/375 |

Primary Examiner—David Smith, Jr.
Attorney, Agent, or Firm—Sughrue, Mion, Zinn, Macpeak and Seas

[57] ABSTRACT

A thyristor (TR) is used to switch over between traction and braking states. Rather than supply a special extinction circuit for the switch-over thyristor, it is connected to make use of the extinction circuit already provided in the chopper circuit (H).

4 Claims, 7 Drawing Figures

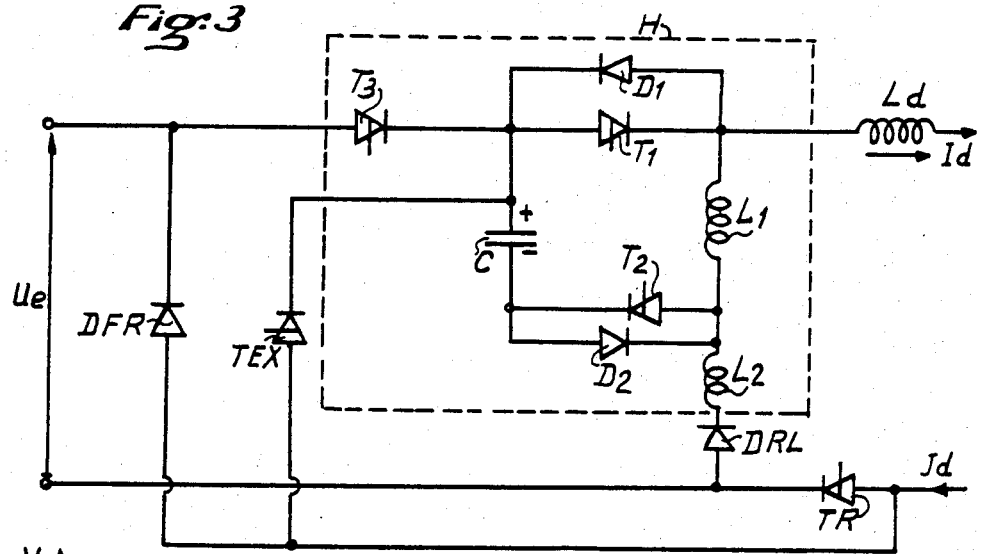
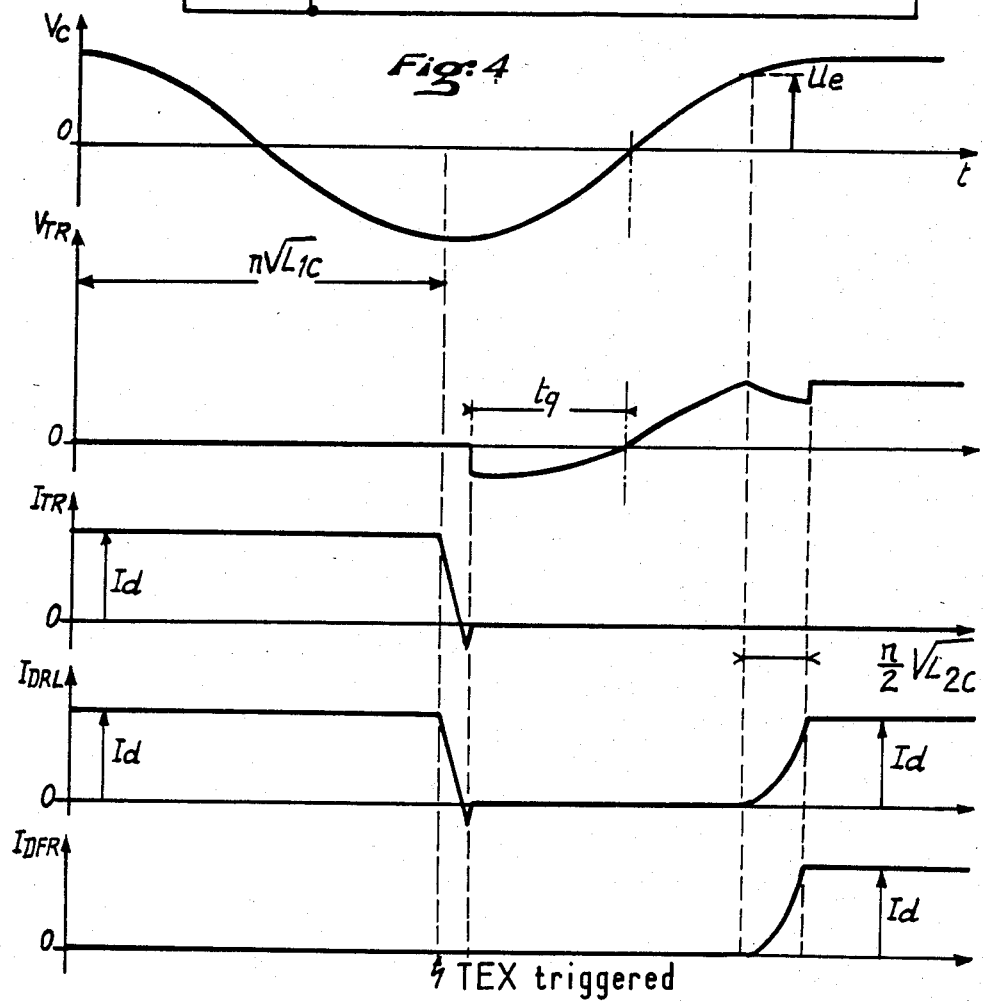

Fig:5
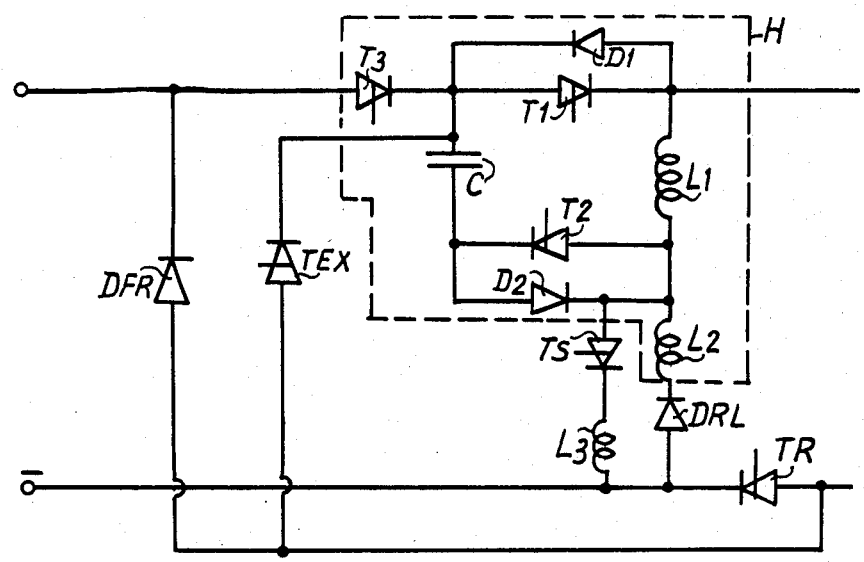
Fig:6
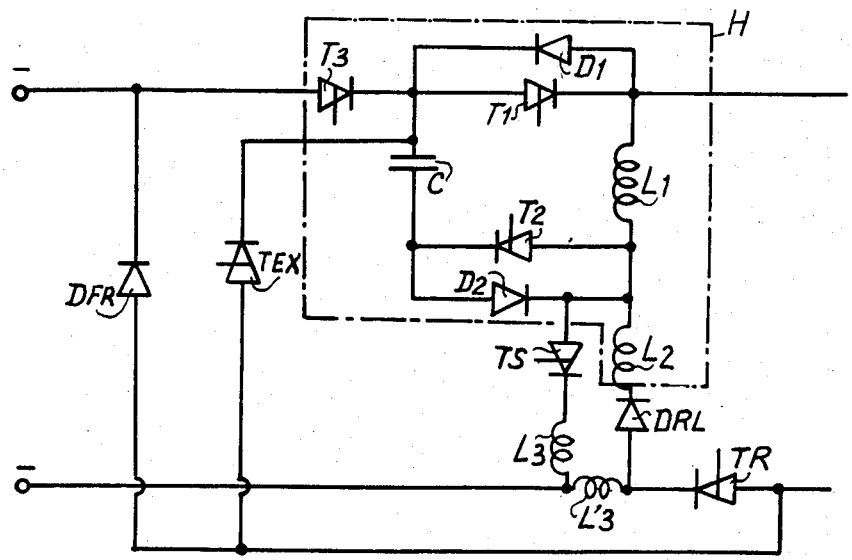

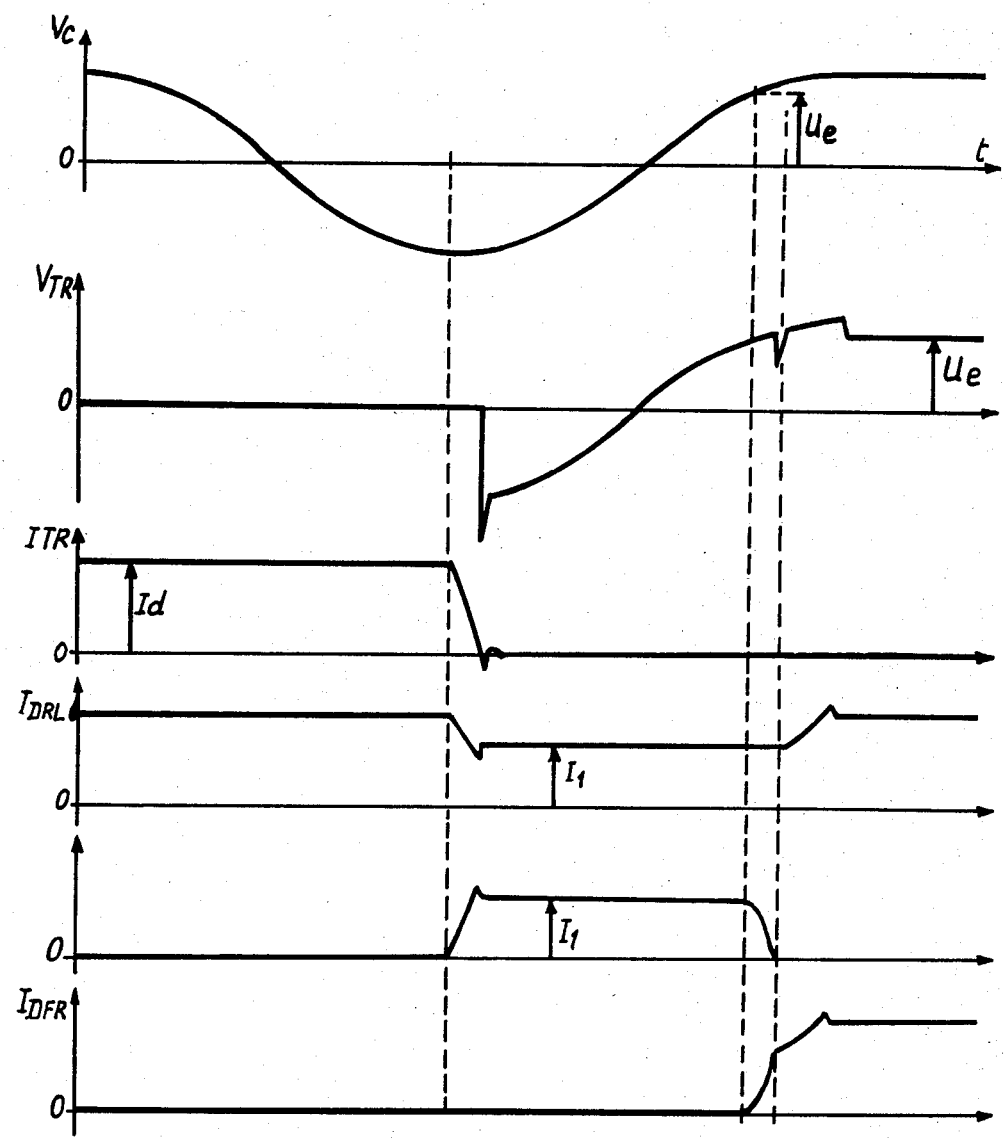

STATIC TRACTION/BRAKING SWITCH-OVER CIRCUIT FOR A VARIABLE SPEED SYSTEM INCLUDING AN ASYNCHRONOUS MOTOR POWERED BY CURRENT SWITCHING

The present invention relates to a high-speed switch-over circuit for switching between two modes of operation, namely between traction and braking, for a variable speed system including an asynchronous motor powered by current switching.

DESCRIPTION OF THE PRIOR ART

For example, in the specific case of a DC powered traction motor, the variable speed system comprises a chopper H (see FIG. 1) constituting an intermediate source DC current Id, and powering one or more asynchronous motors MAS via a current switch or inverter ON.

Switching over between traction operation and braking operation, or vice versa, is performed by a circuit which is essentially constituted in conventional manner by diodes DRL and DFR and by a contactor switch CT. The switch CT is closed for traction and open for braking.

It is well known that a contactor switch has a relatively long response time, of about one tenth of a second. However, in variable speed systems having asynchronous motors which are powered by current switching, it is desirable to have high-speed switching.

Firstly, such high speed ensures good synchronization between the instant at which the switching takes place and control of the inverter, and secondly when such a system switches over from traction to braking, it is necessary to prevent the intermediate current Id which is supplied by the current source to the inverter during traction from being interrupted in order to satisfy the following pair of essential conditions for operation:

sufficient flux must be maintained in the asynchronous motors to ensure that braking is initiated; and proper operation of the current switch must be ensured, and its current-interrupting capacity is linked to the value of the intermediate current Id.

To mitigate the lack of speed and the inaccuracy of timing during contactor switch opening, it is necessary to add an auxiliary circuit comprising a thyristor Tc and a resistance Rc. The auxiliary circuit is connected between the conductors through which the DC intermediate current Id flows at a point in between the inverter ON and the contactor switch CT. The auxiliary circuit is opened during each switch-over in either direction in order to keep the intermediate current Id flowing.

Preferred embodiments of the present invention replace the assembly comprising the contactor switch CT, the thyristor Tc and the resistance Rc by a static high-speed switching system.

SUMMARY OF THE INVENTION

The present invention provides a static traction/braking switch-over circuit for a variable speed system including an asynchronous motor powered by current switching, of the type using a chopper as a source of an intermediate DC, and a switch-over thyristor for switching over between traction and braking, the improvement wherein the chopper extinction circuit is used to ensure extinction of the traction/braking switch-over thyristor.

Preferably the circuit includes at least one of the following features:

an auxiliary extinction thyristor is provided between the anode of the traction/braking switch-over thyristor and the chopper extinction circuit;

a diode connected in series with an inductor connects the cathode of the switch-over thyristor to the chopper extinction circuit, and a circuit constituted by an additional thyristor connected in series with an inductance is connected between the cathode of the switch-over thyristor and the chopper extinction circuit; and at least a portion of said inductance in series with said additional thyristor is connected in series with said switch-over thyristor in the power supply conductor.

BRIEF DESCRIPTION OF THE DRAWINGS

Embodiments of the invention are described by way of example with reference to the accompanying drawings, in which:

FIG. 3 is a more detailed circuit diagram of the main parts of a switching circuit in accordance with the invention;

FIG. 4 is a waveform diagram showing various voltage and current waveforms at differnt points of the FIG. 3 circuit;

FIG. 5 is a circuit diagram of a variant circuit, similar to the FIG. 3 circuit, but including an extra thyristor and inductor;

FIG. 6 is a circuit diagram of a variant of the FIG. 5 circuit, in which the extra inductor is doubled up; and FIG. 7 is a waveform diagram showing various voltage and current waveforms at different points of the FIG. 5 circuit.

MORE DETAILED DESCRIPTION

Figure 1:
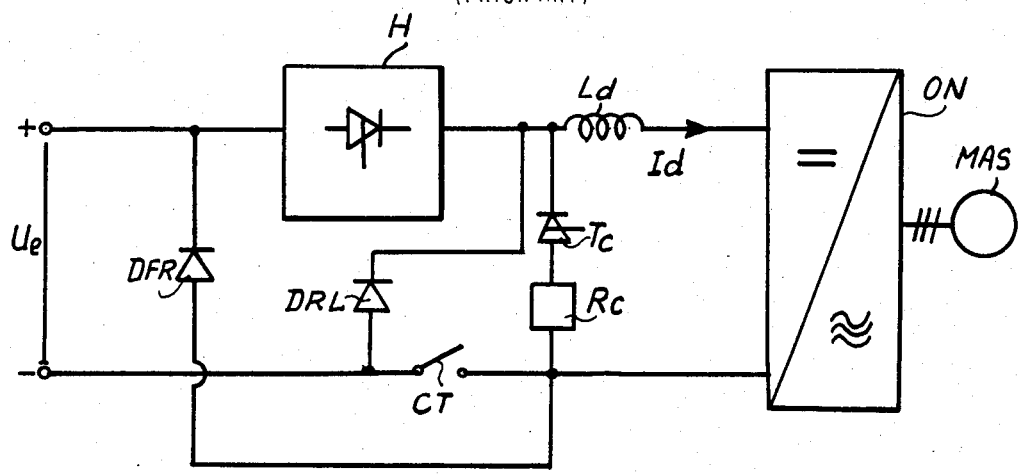
FIG. 1 is a simplified circuit diagram of a prior art traction/braking switch-over circuit using a contactor switch.

FIG. 1 shows a prior circuit which receives a DC input voltage Ue from a DC power supply input. The main chopper H delivers the intermediate current Id via a smoothing inductor Ld to the current switch or inverter ON, which in turn powers one or more asynchronous motors MAS. The contactor switch CT in the negative conductor has both of its terminals connected to the positive conductor: its inverter side (upstream) terminal is connected to the power input side (upstream) terminal of the chopper H via a diode DFR; while its power supply side (downstream) terminal is connected to the inverter side (downstream) terminal of the chopper H via a diode DRL. Its inverter side (upstream) terminal is additionally connected to the inverter side (downstream) terminal of the chopper via the resistance Rc in series with the thyristor Tc.

Figure 2:
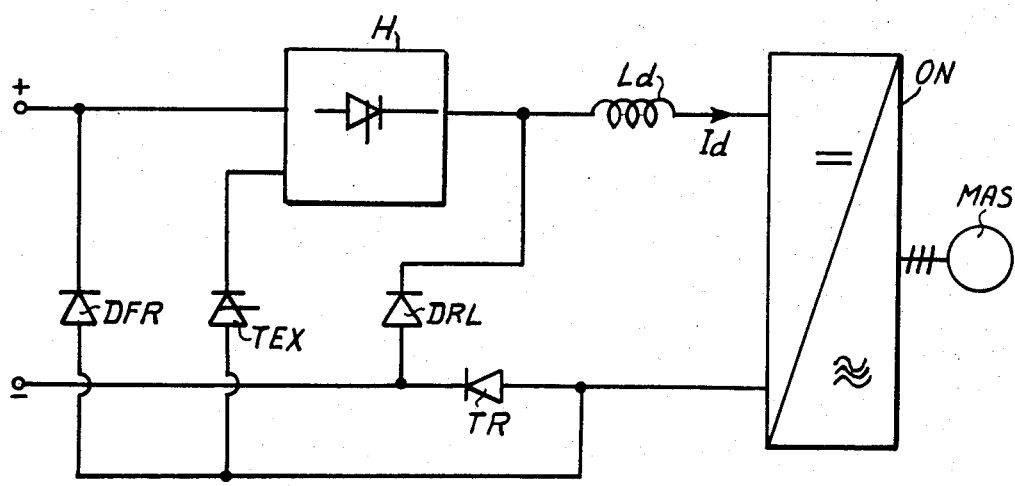
FIG. 2 is a similar diagram of a circuit implementing the present invention by means of a static thyristor switch.

In FIG. 2, which shows a first circuit in accordance with the invention, the diodes DRL and DFR are retained in the same functional positions, and they serve to return current to the power supply during periods of braking when the negative line switch is open circuit. The contactor switch CT of FIG. 1 has been replaced by a a thyristor TR, and an extinction thyristor TEX is provided to connect the extinction circuit of the main chopper H to the thyristor TR in order to switch off the thyristor TR when switcing over from traction to braking. This avoids the need for a special extinction circuit to be provided for the thyristor TR.

FIG. 3 is a more detailed diagram of the circuit shown in FIG. 2. In this figure, the chopper circuit is shown to comprise a control thyristor T3 connected in series with a main thyristor T1 which is bypassed by an antiparallel diode D1, and by a reverse connected thyristor T2 with its own antiparallel diode D2. The DC power supply ends of the antiparallel pairs are interconnected by a capacitor C while their inverter ends are interconnected by an inductor L1. The diode DRL is connected to the positive line via an inductor L2 connected in series with the inductor L1. The inductors and the capacitor form part of the chopper's oscillating extinction circuit. The thyristor TEX is connected between the anode of the thyristor TR and the common point between the anode of the thyristor T1 and the cathode of the thyristor T3.

When switching over from traction to braking, the circuit operates as follows:

While the chopper H is not conducting, the current Id flows via the components TR, DRL, L2, L1, Ld and loops through the inverter and two phases of the motor MAS.

With the thyristor T3 remaining non-conductive, the thyristors T1 and T2 are triggered. The voltage across the terminals of the capacitor C (which is polarized in the direction shown, i.e. with the positive terminal (+) being the terminal connected to the anode of T1) changes direction after a half cycle of sinusoidal shape. The diodes D1 and D2 thus conduct and the thyristors T1 and T2 switch off. At the same instant, the thyristor TEX must be triggered, which has the effect of generating a sinusoidal current in the circuit comprising L2, DRL, TR, TEX, C and D2 in the opposite direction to the normal direction of conduction through the diode DRL and the thyristor TR. The current through these two components thus comes to a rapid stop while the intermediate current Id flows through the components TEX, C, D2, L1 and Ld.

During this time, and as soon as the diodes D1 and D2 are conducting, the current through the capacitor changes direction since the sinusoidal current of the loop C, D2, L1 and D1 passes therethrough in addition to the initially sinusoidal current of the loop C, D2, L2, DRL, TR, TEX, and then the current Id passes therethrough after after DRL and TR turn off.

The voltage across the terminals of the capacitor returns to its initial polarity as marked, and when it reaches the value Ue of the input power supply, the diode DFR starts conducting and finally conducts all of the current Id while at the same time the current passing through TEX drops to zero. Finally, all of the current Id passes through DFR, the DC supply, DRL, L2, L1, Ld, and the inverter and the motor.

FIG. 4 shows the main electrical characteristics of the circuit in FIG. 3.

In the above description the thyristor TEX is triggered at the exact instant when the voltage across the capacitor C reaches its maximum reverse value. However, it is advantageous for the thyristor TEX to be triggered before that instant thereby increasing the off time of the thyristor TR. Such anticipated triggering of the thyristor TEX makes it possible to use a portion of the reactive energy in the inductor L1 as acquired during the initial phase of the reversal for extinguishing the thyristor TR.

Thus, as can be seen in FIG. 4, the time taken to switch over from the traction to braking is short since it is substantially equal to one period $T = 2\pi\sqrt{L1C}$ of the switching circuit, plus the time that may be necessary to turn off the chopper which was assumed to be already turned off at the beginning of the above description. The entire time need not exceed one millisecond.

The speed of the switch-over enables the braking configuration to be adopted without delay, thereby giving full control over the system as a whole, as explained above.

FIG. 5 is a circuit diagram of a variant circuit which is adapted in particular to the case where the charges stored on the thyristor TR and the diode DRL are too far apart due to the thryistor TR being slower and the diode DRL being faster.

A branch constituted by an additional thyristor (TS) and and inductor L3 is connected in parallel with the terminals of the branch constituted by the inductor L2 and the diode DRL. Since the thyristor TS and the inductor L3 are in series, they could readily be connected in the other order.

FIG. 6 is a circuit diagram of a further variant in which an additional inductor L′3 is connected in series in the negative conductor between the inductor L3 and the diode DRL. The inductor L′3 may be used with or without the inductor L3.

Operation with the thyristor TS is not fundamentally different from operation already described. The only point that must be seen to is simultaneous triggering of the thyristors TS and TEX.

The voltage and current waveforms are similar to those of the circuit shown in FIG. 3, except for the current through the diode DRL and the inductor L2 which is not turned off completely after the thyristors TEX and TS are triggered, leaving a current I1 which is smaller than Id flowing through the loop comprising DRL, L2, TS, L3 and/or L′3 (see FIG. 7).

When the voltage across the switching capacitor returns to being positive, and reaches the power supply voltage Ue, the intermediate current which was passing through the thyristor TEX is progressively diverted until it flows entirely through the diode DFR. At the same time, the current flowing through the diode DRL increases the value of the current I1 to Id while the current through TS drops from I1 to 0 (see FIG. 7).

When switching over the other way from braking to traction, replacing the contactor switch CT by the thyristor TR is likewise highly advantageous from the speed point of view. The effect of triggering this thyristor at the same instant as the chopper thyristors T1 and T3 has the effect of immediately turning off the diode DFR, and consequently of instantaneously returning the circuit to its traction configuration, which advantage stems from the possibility provided by the circuit of switching off the thyristor TR in the initial switch over from traction to braking.

I claim:

1. A static traction/braking switch-over circuit device for a variable speed system having a DC power source with first and second terminals and an electric motor supplied from said power source by means of a chopper provided with a forced extinction means, said chopper being interposed in series between said motor and said first terminal of said power source, said switch-over device comprising reversing means for reversing the current from the terminals of said power source, said reversing means comprising a line switch interposed in series between said electric motor and said second terminal of said power source, a first diode (DFR) connected to a point between said first terminal and chopper and connected in reverse polarity to the terminals of said power source via said line switch, and a second diode (DRL) connected to a point between said second terminal and said line switch and connected in reverse polarity to the terminals of said power source via said chopper, said line switch comprising a traction/braking switching thyristor (TR) extinguished by said forced extinction means of said chopper.

2. A static traction/braking switch-over circuit device for a variable speed system having a DC power source with first and second terminals and an electric motor supplied from said power source by means of a chopper provided with a forced extinction circuit, said chopper being connected in series between said first terminal of said power source and said electric motor, said chopper comprising a controlled thyristor and a principal thyristor (T1) connected to said first terminal of said power source by means of said control thyristor, said chopper having a forced extinction circuit including a series oscillation circuit having an inductance (L1) and capacitance (C), said inductance being directly connected to the output of said chopper, said switch-over circuit device including reversing means for reversing the direction of current from the terminals of said power source, said reversing means comprising a line switch interposed in series with said second terminal of said power source, a first diode (DFR) connected to a point between said first terminal and said chopper and connected in reverse to said terminals of said power source by means of said line switch, and a second diode (DRL) connected to a point between said line switch and said second terminal and connected in reverse to said terminals of said power source by means of said chopper, said line switch comprising a traction/braking switch thyristor (TR), said second diode (DRL) being connected to the output of said chopper by means of said inductance (L1) of said forced extinction circuit and by means of a second inductance, and said switch-over device further comprising an auxiliary extinction thyristor (TEX) connected in parallel and in the same direction as a series assembly form by said first diode (DFR) and said control thyristor (T3).

3. The device according to claim 2, further comprising a series assembly formed by a third inductance (L3) and an additional thyristor (TS) arranged in parallel and in the reverse direction to a series assembly formed by said second diode (DRL) and said second inductance (L2).

4. The device according to claim 3, wherein at least a portion of said third inductance is connected in series between said switching thrysitor (TR) and said second terminal of said power source.

* * * * *